US005783822A

United States Patent [19]
Buchanan et al.

[11] Patent Number: 5,783,822
[45] Date of Patent: Jul. 21, 1998

[54] TRACEABLE WELL CEMENT COMPOSITIONS AND METHODS

[75] Inventors: Ronnie J. Buchanan; Jiten Chatterji; James F. Heathman, all of Duncan, Okla.

[73] Assignee: Halliburton Energy Services, Inc., Duncan, Okla.

[21] Appl. No.: 857,845

[22] Filed: May 16, 1997

Related U.S. Application Data

[63] Continuation of Ser. No. 734,316, Oct. 21, 1996, abandoned, which is a continuation-in-part of Ser. No. 572,339, Dec. 14, 1995, abandoned.

[51] Int. Cl.⁶ .............................. G01V 5/00; G01V 5/10
[52] U.S. Cl. ............................................ 250/259; 250/302
[58] Field of Search ................................. 250/259, 260, 250/302, 303

[56] References Cited

U.S. PATENT DOCUMENTS

| | | | |
|---|---|---|---|
| 2,231,577 | 2/1941 | Hare | 250/302 X |
| 3,019,341 | 1/1962 | Monaghan . | |
| 4,122,341 | 10/1978 | Smith, Jr. | 250/259 X |
| 4,731,531 | 3/1988 | Handke | 250/259 |
| 5,001,342 | 3/1991 | Rambow | 250/259 X |
| 5,083,029 | 1/1992 | Buchanan . | |
| 5,243,190 | 9/1993 | Bandy et al. | 250/259 X |
| 5,252,832 | 10/1993 | Nguyen et al. . | |

FOREIGN PATENT DOCUMENTS

| | | | |
|---|---|---|---|
| 0 234 731 | 9/1987 | European Pat. Off. . | |
| 443936 | 8/1991 | European Pat. Off. | 250/259 |
| 7 106 710 | 11/1972 | Netherlands . | |
| 1 348 159 | 3/1974 | United Kingdom . | |

OTHER PUBLICATIONS

Derwent Publications Ltd., London GB; Class L02, AN 86-244542, XP002028088 & SU 1 209 636A (Perm Poly), Feb. 7, 1986, Abstract.

*Primary Examiner*—Edward J. Glick
*Attorney, Agent, or Firm*—Craig W. Roddy

[57] ABSTRACT

The present invention provides improved traceable well cement compositions and methods. The compositions are basically comprised of hydraulic cement, sufficient water to form a pumpable slurry and a normally non-radioactive tracer compound which becomes radioactive and emits detectible rays over a relatively short time period when exposed to neutrons. The methods of the invention relate to cementing a zone in a well and subsequently detecting the subterranean location of the cement composition therein. A traceable well cement composition of the invention is formed and introduced into a subterranean zone to be cemented. Neutrons are then emitted from a source in the well so that the tracer compound emits detectible rays, the rays are detected and the location of the cement composition in the well is determined.

25 Claims, 1 Drawing Sheet ered to as
TRACEABLE WELL CEMENT COMPOSITIONS AND METHODS

This is a continuation of application Ser. No. 08/734,316, filed Oct. 21, 1996, now abandoned, which is a continuation-in-part of application Ser. No. 08/572,339, filed Dec. 14, 1995, now abandoned.

BACKGROUND OF THE INVENTION

1. Field of the Invention

The present invention relates to improved traceable well cement compositions and methods, and more particularly, to methods of detecting the location of a cement composition after the cement composition has been introduced into a well and used for carrying out a cementing operation.

2. Description of the Prior Art

In carrying out well completion and remedial operations in oil, gas and water wells, hydraulic cement compositions are commonly utilized. For example, hydraulic cement compositions are used in primary cementing operations whereby pipe such as casing is cemented in the well bore. That is, a hydraulic cement composition is pumped into the annular space between the walls of the well bore and the exterior of a pipe disposed therein. The cement composition is allowed to set in the annulus thereby forming an annular sheath of hard substantially impermeable cement therein. The objective of the cement sheath is to physically support and position the pipe in the well bore and bond the pipe to the walls of the well bore whereby the undesirable migration of fluids between zones or formations penetrated by the well bore is prevented.

Remedial cementing operations (often referred to as squeeze cementing) generally involve the placement of a cement composition into cracks or openings in a pipe disposed in a well bore, in the cement sheath in the annulus between the pipe and the well bore and other similar locations. After placement, the cement composition is allowed to set whereby the cracks or openings are plugged.

In all of the various cementing operations utilized in wells, it is difficult to confirm that the cement composition has entered and/or filled the desired subterranean zone. As a result, methods of detecting the locations of well cement compositions after they have been introduced into well bores have heretofore been developed and used. Typically, a continuously radioactive tracer material is included in the cement composition, and after the placement of the treating fluid containing the radioactive tracer, an instrument which detects radioactivity is lowered in the well and utilized to determine the location or locations of the cement composition.

While the heretofore used methods involving radioactive tracer materials have been utilized successfully, the radioactive tracer materials used have had long half-lives and as a result have essentially been continuously radioactive. Such continuously radioactive tracer materials are expensive and are considered hazardous whereby they and the fluids containing them must be handled and disposed of in accordance with the laws and rules relating to hazardous materials.

Thus, there is a need for improved traceable well cement compositions and methods of using such compositions in well cementing operations and then detecting their subterranean locations which do not involve the use of continuously radioactive tracer materials or other hazardous materials which must be disposed of in a special manner.

SUMMARY OF THE INVENTION

The present invention provides improved traceable well cement compositions and methods which meet the above described needs and overcome the shortcomings of the prior art. Instead of continuously radioactive or other hazardous tracer materials which must be handled and disposed of in a special environmentally safe manner, the cement compositions and methods of the present invention utilize non-hazardous tracer materials which are normally non-radioactive. That is, the normally non-radioactive tracer materials of the present invention become radioactive when exposed to neutrons and emit detectible rays over relatively short half-lives. At the end of the half-life time periods, the tracer materials become non-radioactive and non-hazardous. Also, because of the short half-lives of the materials, there is no danger of contaminating the wells in which the materials are used. In accordance with another aspect of the present invention, a tracer material of the type described above which also functions to accelerate the early strength development of the cement composition is utilized.

Thus, the improved well cement compositions of the present invention are comprised of hydraulic cement, sufficient water to form a pumpable slurry and a normally non-radioactive tracer compound which becomes radioactive and emits detectible rays over a relatively short time period when exposed to neutrons. In cementing applications which require a cement composition having accelerated early strength development, at least a portion of the tracer material in the cement composition is a normally non-radioactive tracer compound of the type described above which also functions to accelerate the early strength development of the cement composition.

The improved methods of this invention for cementing a zone in a well bore and subsequently detecting the subterranean location of the cement therein are basically comprised of the steps of combining a normally non-radioactive tracer compound of the type described above with a hydraulic cement composition, introducing the cement composition into the subterranean zone to be cemented, emitting neutrons from a source thereof in the well whereby the tracer compound becomes radioactive and emits detectible rays, detecting the presence of the detectible rays and thereby determining the location of the cement composition in the well.

It is, therefore, a general object of the present invention to provide improved traceable well cement compositions and methods.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Figure 1:
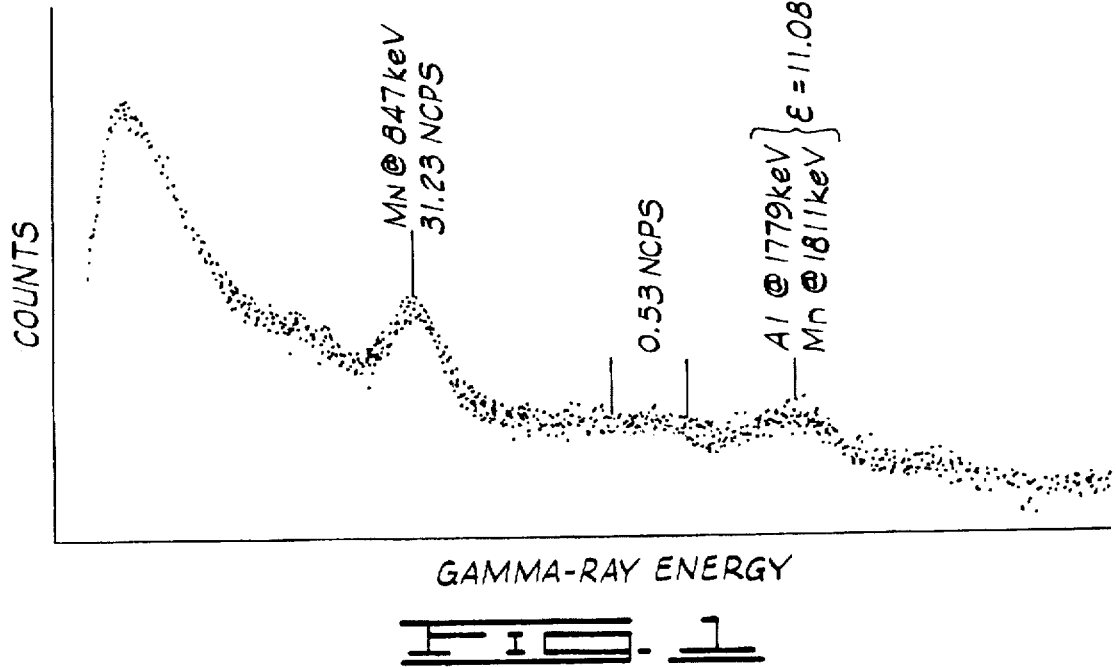
FIG. 1 is a graph showing the gamma ray energy spectrum of a 16 pound per gallon cement slurry which does not include a tracer compound within a simulated cased well bore.

The present invention provides improved traceable well cement compositions and methods of using the compositions in well cementing operations. The traceable well cement compositions are basically comprised of a hydraulic cement, sufficient water to form a pumpable slurry and a non-hazardous normally non-radioactive tracer compound which becomes radioactive and emits detectible rays over a relatively short time period when exposed to neutrons.

The hydraulic cement can be any of the various hydraulic cements, both normal particle size and ultra fine particle size, utilized heretofore in well cementing which are well known to those skilled in the art. Generally, Portland cements or the equivalent are preferred and can be, for example, one or more of the various types identified as API Classes A–H and J cements. These cements are described and defined in *API Specification For Materials And Testing For Well Cements*, API Specification 10A, 5th Edition dated Jul. 1, 1990, of the American Petroleum Institute which is incorporated herein by reference. API Portland cements generally have a maximum particle size of about 90 microns and a specific surface (sometimes referred to as Blaine Fineness) of about 3,900 square centimeters per gram. A highly useful and effective cement slurry base for use in carrying out well cementing operations is comprised of API Portland cement mixed with water to provide a density of from about 11.3 to about 18.0 pounds per gallon.

It is often highly advantageous to use a fine particle size hydraulic cement, particularly in remedial operations involving squeeze cementing. Such fine particle size hydraulic cement generally consists of particles having diameters no larger than about 30 microns and having a Blaine Fineness no less than about 6,000 square centimeters per gram. Fine particle size hydraulic cements and their use in well completion and remedial operations are disclosed in U.S. Pat. No. 5,121,795 issued Jun. 16, 1992 to Ewert et al. and No. 5,125,455 issued Jun. 30, 1992 to Harris et al., both of which are incorporated herein by reference.

The water used in well cement compositions can be water from any source provided that it does not contain an excess of compounds which adversely react with or otherwise effect other components in the cement composition. Generally, the water is selected from the group consisting of fresh water, salt water, brines and seawater and is present in the range of from about 30% to about 60% by weight of dry cement in the composition when the cement is of normal particle size. When a cement of fine particle size as described above is used, water is generally present in the cement composition in an amount in the range of from about 100% to about 200% by weight of dry cement in the composition. A dispersing agent, such as the dispersing agent described in U.S. Pat. No. 4,557,763 issued on Dec. 10, 1985 to George et al., can be included in the fine particle size cement composition to facilitate the formation of a slurry and prevent the premature gellation of the cement composition.

As is well understood by those skilled in the art, to obtain optimum results in well cementing applications, a variety of additives are included in the cement compositions utilized. Such additives are used to vary the density, increase or decrease strength, accelerate or retard the time of setting, reduce fluid loss, etc. The preferred and most commonly utilized cement compositions for performing treatments in oil and gas wells are those meeting the specifications of the American Petroleum Institute comprising Portland cement mixed with water and other additives to provide a cement composition having properties appropriate for the conditions existing in each individual subterranean zone to be cemented.

A variety of normally non-radioactive elements in compound form which become radioactive and emit detectible rays, e.g., gamma rays, over a relatively short time period when exposed to neutrons can be utilized in accordance with this invention. The compounds must be chemically compatible with the cement composition and the elements in the compounds must have relatively large neutron absorption cross-sections whereby they emit detectible rays having sufficient energy to reach the ray detector. Further, the half-lives of the activated elements must be long enough to be detected, but not so long that the activity of the emitted rays is low making them difficult to detect. The particular tracer compound to be used in a well cement composition depends on the particular cementing application in which the cement composition is to be used. Generally, elements having relatively large neutron cross-sections and having half-lives in the minutes to hours range are most suitable. A variety of elements meet the foregoing criteria. Examples of such elements are dysprosium (Dy), europium (Eu), indium (In) and vanadium (V). More specifically, preferred non-radioactive tracers comprise water insoluble vanadium compounds. Preferred water insoluble vanadium compounds are selected from the group consisting of vanadium trioxide, vanadium trisulfide, vanadium carbide, vanadium silicide, mixtures thereof and the like. However, it is to be understood that water soluble vanadium compounds also may be utilized. Such water soluble compounds are selected from the group consisting of vanadium pentoxide, vanadium trisulfate, vanadyl sulfate, mixtures thereof and the like.

In applications where it is desirable that the cement compositions have an accelerated early strength development, the tracer compound used is a compound of a detectible ray emitting element which also functions as a early strength accelerator in cement compositions. An example of a presently preferred tracer compound which accelerates early strength development in cement compositions is vanadium pentoxide. In applications where the quantity of the tracer compound which accelerates early strength development is small as compared to the overall quantity of tracer compound required for detection, the tracer compound can be made up of a small quantity of a strength accelerating tracer compound, e.g., vanadium pentoxide, with the remaining portion of the tracer compound being made up of a non-strength accelerating compound, e.g., vanadium carbide. Generally, the total tracer compound included in a cement composition is an amount in the range of from about 0.05% to about 5% by weight of hydraulic cement therein.

Thus, a traceable well composition of this invention is basically comprised of hydraulic cement, sufficient water to form a pumpable slurry and a normally non-radioactive tracer compound which becomes radioactive and emits detectible rays over a relatively short time period when exposed to neutrons.

A traceable well cement composition of this invention having accelerated early strength is comprised of hydraulic cement, sufficient water to form a pumpable slurry and a normally non-radioactive tracer compound which accelerates the early strength development of the cement composition and which becomes radioactive over a relatively short time period when exposed to neutrons whereby detectible rays are emitted. As mentioned above, when the amount of strength accelerating tracer compound required in a particular cementing application is less than the total amount of tracer compound required to insure detection, the difference is made up by a tracer compound which does not function as a strength development accelerator.

The present invention also provides improved methods of cementing zones in wells utilizing the non-hazardous hydraulic cement compositions of this invention and subsequently detecting the subterranean locations of the cement compositions. The methods basically comprise the steps of combining with a well cement composition a normally non-radioactive tracer compound which becomes radioactive and emits detectible rays over a relatively short time period when exposed to neutrons, introducing the cement composition into a zone to be cemented, emitting neutrons from a source thereof in the well whereby the tracer compound becomes radioactive and produces detectible rays and detecting the presence of the detectible rays to thereby determine the location of the cement composition in the well.

The step of emitting neutrons in the well is accomplished by lowering a neutron source through the well bore. The neutron source can be any unit that produces a neutron output in the energy range required to cause the activation of the tracer element in the cement composition and the emission of detectible rays such as gamma rays over a short time period.

The neutron source can be, for example, neutrons produced from a plutonium-beryllium source, an americium-beryllium source, a polonium-beryllium source, a spontaneous fission neutron source such as californium 252, or generator produced neutrons such as D—T or D—D neutrons.

The ray detector can be any suitable radiation detector that will provide an energy spectrum of the rays emitted. It must have the energy resolution and detection efficiency required to obtain statistically valid results in a reasonable time. Examples of suitable detectors for use with the tracer compounds mentioned above are sodium iodide scintillation gamma ray detectors and germanium diode gamma ray detectors. In practice, the neutron source and ray detector are lowered in the well bore, such as by means of a wire line, whereby the tracer compound is first activated by exposure to neutrons followed by the detection of gamma or other detectible rays emitted by the tracer element. This general type of instrument is commonly utilized in well logging operations and is well known to those skilled in the art.

A particularly preferred method of the present invention is comprised of the steps of forming a traceable well cement composition comprising hydraulic cement, sufficient water to form a pumpable slurry and a normally non-radioactive tracer compound selected from the group consisting of vanadium pentoxide, vanadium carbide and mixtures of such compounds, introducing the cement composition into a zone to be cemented, emitting neutrons from a source thereof in the well whereby the tracer compound becomes radioactive and emits detectible gamma rays and detecting the presence of the gamma rays and thereby determining the location of the cement composition in the well.

In order to further illustrate the compositions and methods of the present invention the following example is given.

EXAMPLE

Tests were conducted utilizing vanadium pentoxide as the tracer compound in a cement composition. The tracer compound was activated using a 5 curie americium-beryllium (AmBe) neutron source. The gamma rays subsequently emitted were detected using a 3"×3" sodium iodide scintillation gamma ray detector. The data was acquired and analyzed by a 2048 channel multichannel analyzer.

A cased well bore configuration was simulated by a pipe within a pipe arrangement. That is, an inner pipe having a 4.38" I.D.×5.0" O.D. was placed within an 8.88" I.D. outer pipe. The annulus between the inner and outer pipes was first filled with a 16 pound per gallon cement slurry which did not contain a tracer compound. Subsequently, a 16 pound per gallon cement slurry containing 1 by weight of dry cement of vanadium pentoxide was placed in the annulus.

For each cement composition tested, the 5 curie AmBe neutron source was positioned at the center of the inner pipe for a period of 420 seconds. The neutron source was then removed and the sodium iodide gamma ray detector was inserted into the center of the inner pipe. Data was collected by the detector for a period of 420 seconds.

The results of the tests using the cement composition without a trace compound are illustrated in FIG. 1 which is a graph of the detected gamma ray energy spectrum. As shown, only the 847 kilo-electron Volt (keV) and 1811 keV Mn-56 gamma ray energy peaks from neutron activation of iron in the pipe and the 1779 keV Al-28 gamma rays from neutron activation of silicon in the cement are present.

Figure 2:
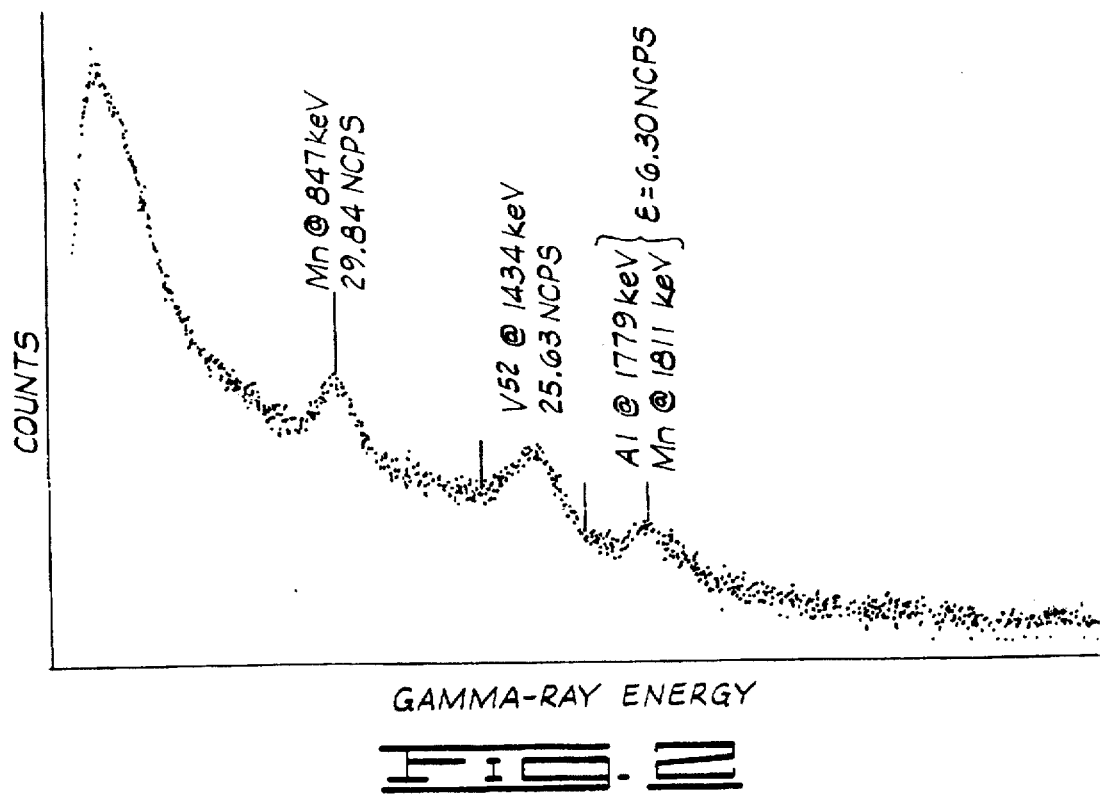
FIG. 2 is a graph showing the gamma ray energy spectrum of a 16 pound per gallon cement composition which includes a tracer compound of this invention within a simulated cased well bore.

FIG. 2 shows the results when the same experiment was conducted with the cement slurry containing 1% vanadium pentoxide by weight of cement. The 1434 keV gamma ray energy peak, containing 25 net count per second (NCPS), resulting from the decay of V-52 that was created due to the V-51 (n,γ) V-52 reaction is visibly present. The half-life of V-52 is 3.75 minutes which provides for a reasonable neutron irradiation and gamma ray collection time of 7 minutes each. An irradiation time and a collection time of approximately two half-lives each allows for the most statistically meaningful data to be obtained when other activation products are present. The 1434 keV gamma ray energy of V-52 is ideal because it falls between the 847 keV and the 1811 keV gamma ray energy peaks from the neutron activation of iron in the pipe. Those two reference peaks will always be present when a neutron source is used in cased down hole applications and can be utilized as gamma ray energy calibration points for the gamma ray detector.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A traceable well cement composition having accelerated early strength comprising:

a hydraulic cement;

sufficient water to form a pumpable slurry;

a normally non-radioactive tracer compound which accelerates the early strength development of said cement composition and which becomes radioactive when exposed to neutrons whereby detectible rays are emitted; and a normally non-radioactive tracer compound which does not accelerate the early strength development of said cement composition and which becomes radioactive when exposed to neutrons whereby detectible rays are emitted.

2. The composition of claim 1 wherein said tracer compound is vanadium pentoxide.

3. The composition of claim 1 wherein said tracer compound is present in said composition in an amount in the range of from about 0.05% to about 5% by weight of hydraulic cement therein.

4. The composition of claim 1 wherein said hydraulic cement is Portland cement.

5. The composition of claim 1 wherein said water is selected from the group consisting of fresh water, salt water, brines and seawater.

6. The composition of claim 1 wherein said tracer compound which accelerates the early strength of said cement composition is vanadium pentoxide and said tracer compound which does not accelerate the strength of said cement composition is vanadium carbide.

7. An improved method of cementing a zone in a well utilizing a hydraulic cement composition and subsequently detecting the subterranean location of the cement composition therein comprising the steps of:

combining with said cement composition a normally non-radioactive tracer compound which becomes radioactive and emits detectible rays when exposed to neutrons, wherein said tracer compound accelerates the early strength development of said cement composition;

introducing said cement composition into said zone to be cemented;

emitting neutrons from a source thereof in said well whereby said tracer compound becomes radioactive and emits detectible rays; and detecting the presence of said detectible rays and thereby determining the location of said cement composition in said well.

8. The method of claim 7 wherein said tracer compound is vanadium pentoxide.

9. The method of claim 7 wherein said tracer compound is present in said cement composition in an amount in the range of from about 0.05% to about 5% by weight of hydraulic cement therein.

10. The method of claim 7 wherein said hydraulic cement is Portland cement.

11. The method of claim 7 wherein said cement composition further comprises a non-strength accelerating tracer compound which also becomes radioactive and emits detectible rays when exposed to neutrons.

12. The method of claim 11 wherein said cement strength accelerating tracer compound is vanadium pentoxide and said non-strength accelerating tracer compound is vanadium carbide.

13. An improved method of cementing a subterranean zone in a well comprising the steps of:

introducing a traceable cement composition into the subterranean zone to be cemented, said cement composition comprising:

a hydraulic cement;

sufficient water to form a pumpable slurry; and a normally non-radioactive tracer compound which accelerates the early strength development of the cement composition and which becomes radioactive when exposed to neutrons whereby detectible rays are emitted;

emitting neutrons from a source thereof in the well whereby said tracer compound becomes radioactive and emits detectible rays; and detecting the presence of said detectible rays and thereby determining the location of said cement composition in the well.

14. The composition of claim 13 wherein said tracer compound is vanadium pentoxide.

15. The composition of claim 13 wherein said tracer compound is present in said composition in an amount in the range of from about 0.05% to about 5% by weight of hydraulic cement therein.

16. The composition of claim 13 wherein said hydraulic cement is Portland cement.

17. The composition of claim 13 wherein said water is selected from the group consisting of fresh water, salt water, brines and seawater.

18. The composition of claim 13 which further comprises a tracer compound which becomes radioactive and emits detectible rays when exposed to neutrons but does not accelerate the early strength development of said cement composition.

19. The composition of claim 18 wherein said tracer compound which accelerates the early strength of said cement composition is vanadium pentoxide and said tracer compound which does not accelerate the strength of said cement composition is vanadium carbide.

20. A method of cementing a zone in a well utilizing a hydraulic cement composition and subsequently detecting the subterranean location of the cement composition therein comprising the steps of:

combining with said cement composition a normally non-radioactive tracer which becomes radioactive and emits detectible rays when exposed to neutrons, wherein said tracer is a vanadium compound;

introducing said cement composition into said zone to be cemented;

emitting neutrons from a source thereof in said well whereby said tracer compound becomes radioactive and emits detectible rays; and detecting the presence of said detectible rays and thereby determining the location of said cement composition in said well.

21. The method of claim 20 wherein said tracer compound is selected from the group consisting of vanadium pentoxide, vanadium trisulfate, vanadyl sulfate, vanadium trioxide, vanadium trisulfide, vanadium carbide and vanadium silicide and mixtures thereof.

22. The method of claim 20 wherein said tracer compound is present in said composition in an amount in the range of from about 0.05% to about 5% by weight of hydraulic cement therein.

23. The method of claim 20 wherein said vanadium compound is water insoluble.

24. The method of claim 20 wherein said hydraulic cement is Portland cement.

25. The method of claim 20 wherein said water is selected from the group consisting of fresh water, salt water, brines and seawater.

* * * * *